US006427310B1

(12) United States Patent
Kerr

(10) Patent No.: US 6,427,310 B1
(45) Date of Patent: Aug. 6, 2002

(54) METHOD FOR FABRICATING A PRINT ENGINE CHASSIS FOR SUPPORTING AN IMAGING DRUM AND PRINTHEAD TRANSLATION ASSEMBLY

(75) Inventor: Roger S. Kerr, Brockport, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/504,552

(22) Filed: Feb. 15, 2000

(51) Int. Cl.[7] .......................... B23P 25/00; B23P 19/04

(52) U.S. Cl. .......................... 29/458; 29/460; 264/135; 264/263; 264/271.1; 400/464; 400/491; 347/245; 347/263

(58) Field of Search ................................ 347/110, 245, 347/263, 108; 346/138, 139 R, 145; 400/691, 692, 693, 694; 361/679, 829; 427/388.1; 29/458, 460; 264/134, 135, 263, 271.1, 254

(56) References Cited

U.S. PATENT DOCUMENTS 3,707,033 A * 12/1972 Knott .......................... 29/460
4,301,850 A * 11/1981 Schneider et al. ....... 264/271.1
4,576,088 A * 3/1986 Mathewes et al. .......... 454/194
4,616,944 A * 10/1986 Galatha et al. ............. 400/692
5,268,708 A 12/1993 Harshbarger et al.
5,369,549 A 11/1994 Kopp et al.
5,775,825 A * 7/1998 Hong et al. ................. 400/693
5,936,647 A * 8/1999 Rhodes et al. ................ 347/29
5,967,345 A * 10/1999 Subotin ................ 211/119.007

FOREIGN PATENT DOCUMENTS

JP 1-275174 A * 11/1989 ................. 400/693
SE 308749 A * 2/1969 ................. 361/679

* cited by examiner

*Primary Examiner*—David F. Yockey
(74) *Attorney, Agent, or Firm*—Nelson Adrian Blish

(57) ABSTRACT

A print engine chassis for supporting an imaging drum (14) and a printhead translation assembly (40) is fabricated by joining the interlocking rigid members using tab (36) and slot (38) junctions to form a sheet metal frame (12) and then coating the sheet metal frame with a plastic (39) to bond the rigid members in place. Additionally, a the rigid members may be predipped in plastic prior to joining.

2 Claims, 4 Drawing Sheets

METHOD FOR FABRICATING A PRINT ENGINE CHASSIS FOR SUPPORTING AN IMAGING DRUM AND PRINTHEAD TRANSLATION ASSEMBLY

FIELD OF THE INVENTION

This invention relates in general to a printer and methods of manufacturing a printer and more particularly to a print engine chassis fabricated using interlocking rigid members that fit together without fasteners and which are coated to hold the rigid members in place.

BACKGROUND OF THE INVENTION

Pre-press color proofing is a procedure used by the printing industry to create representative images of printed material. This procedure avoids the high cost and time required to produce printing plates and set-up a high-speed, high-volume printing press to produce a single intended image for proofing prior to a production run of the intended image. In the absence of pre-press proofing, a production run may require several corrections to the intended image to satisfy customer requirements, and each of the intended images would require a new set of printing plates. By utilizing pre-press color proofing, time and money are saved.

A laser thermal printer having half-tone color proofing capabilities is disclosed in commonly assigned U.S. Pat. No. 5,268,708 titled "Laser Thermal Printer With An Automatic Material Supply," issued Dec. 7, 1993 in the name of R. Jack Harshbarger, et al. The Harshbarger, et al. device is capable of forming an image on a sheet of thermal print media by transferring dye from a roll of dye donor material to the thermal print media. This is achieved by applying thermal energy to the dye donor material to form an image on the thermal print media. This apparatus comprises a material supply assembly; a lathe bed scanning subsystem, which includes a lathe bed scanning frame, a translation drive, a translation stage member, a laser printhead; a rotatable vacuum imaging drum; and exit transports for the thermal print media and dye donor material.

The Harshbarger, et al. apparatus meters a length of the thermal print media in roll form from a material supply assembly. The thermal print media is measured and cut into sheets of the required length, transported to the vacuum imaging drum, and wrapped around and secured to the vacuum imaging drum. A length of dye donor roll material is metered out of the material supply assembly, measured, and cut into sheets of the required length. The cut sheet of dye donor roll material is transported to and wrapped around the vacuum imaging drum, and superposed in registration with the thermal print media. The scanning subsystem traverses the printhead axially along the rotating vacuum imaging drum to produce the image on the thermal print media. The image is written in a single swath, traced out in a pattern of a continuous spiral, concentric with the imaging drum, as the printhead is moved parallel to the drum axis.

Although the printer disclosed in the Harshbarger, et al. patent performs well, there is a long-felt need to reduce manufacturing costs for this type of printer and for similar types of imaging apparatus. With respect to the lathe bed scanning frame disclosed in the Harshbarger, et al. patent, the machined casting used as the frame represents significant cost relative to the overall cost of the printer. Cost factors include the design and fabrication of the molds, the casting operation, and subsequent machining needed to achieve the precision necessary for a lathe bed scanning engine.

Castings present inherent problems in modeling, making it difficult to use design tools such as finite element analysis to predict the suitability of a design. Moreover, due to shrinkage, porosity, and other manufacturing anomalies, it is difficult to obtain uniform results when casting multiple frames. In the assembly operation, each frame casting must be individually assessed for its suitability to manufacturing standards and must be individually machined. Further, castings also exhibit frequency response behavior, such as to resonant frequencies, which are difficult to analyze or predict. For this reason, the task of identifying and reducing vibration can require considerable work and experimentation. Additionally, the overall amount of time required between completion of a design and delivery of a prototype casting can be several weeks or months.

Alternative methods used for frame fabrication have been tried, with some success. For example, welded frame structures have been used. However, these welded structures require skilled welding and significant expense in manufacture.

Depending on the weight and forces exerted by supported components, a sheet metal structure, by itself, may provide sufficient support for a print engine chassis structure. However, the construction of a sheet metal chassis can require a considerable number of fasteners for assembly. This adds cost and complexity to the chassis assembly operation, adding to the total number of parts needed to build a chassis and increasing the number of manufacturing steps.

Plastic coatings are widely used to protect metal surfaces against rust and corrosion, to provide gripping areas, to insulate, to dampen vibration, and for other purposes. While it is known that a coating can provide additional adhesion between joined sheet metal parts, this principle has not been applied to sheet metal chassis for printers or other imaging devices.

Snap-together assemblies that do not require fasteners have been utilized for electronic devices, as disclosed in U.S. Pat. No. 5,369,549, Kopp, et al., which discloses a casing assembled without tools. However, print engine chassis have been designed to use fastener hardware, which adds cost and complexity to the manufactured printer.

There has been a long-felt need to reduce the cost and complexity of printer fabrication. However, prior art solutions have been limited to the use of conventional castings or weldments, or have employed fasteners for holding chassis parts together.

SUMMARY OF THE INVENTION

It is the object of the present invention is to provide a sheet metal frame for a print engine chassis that can be assembled without fasteners. The goal is to provide a chassis that is structurally rigid, has superior vibration dampening, is economical to manufacture, and which can be easily manufactured.

According to one aspect of the present invention, a print engine chassis for supporting an imaging drum and a printhead translation assembly comprises a sheet metal frame. A plurality of interlocking rigid members comprises the sheet metal frame, and a plastic coating bonds the rigid members in place.

According to an embodiment of the present invention, sheet metal pieces are cut to form the interlocking rigid members, having tabs and slots that allow the interlocking rigid members to be quickly assembled by hand in order to form the sheet metal of the chassis. The assembled structure is then coated, by dipping, spraying, or other means, to provide a rigid chassis. The plastic coating provides a seal that adheres to interlocking rigid members and holds them together at slot-and-tab junctions.

A feature of the present invention is the provision of a method for providing a chassis that can be easily manufactured, but is at the same time sufficiently structurally rigid to act as a suitable replacement for a metal casting or weldment in some applications.

An advantage of the present invention is that individual interlocking rigid members can be modified in order to change the design of the chassis, or to modify the size or configuration of the overall structure. This contrasts with methods using a casting, which cannot be easily modified or scaled dimensionally.

Another advantage of the present invention is that individual interlocking rigid members can be fabricated for use with a number of different configurations. By providing alternate slot and tab features on a rigid member, a designer has flexibility which results in potential cost savings by cutting down the number of parts that would be needed to support multiple printer configurations.

Yet another advantage of the present invention is provided by the inherent vibration damping properties of many types of plastic coatings. This vibration damping helps to isolate the print engine chassis from vibration effects caused by motors, fans, vacuum equipment, power supplies, or other components housed within a printer frame.

These and other objects, features and advantages of the present invention will become apparent to those skilled in the art upon a reading of the following detailed description when taken in conjunction with the drawings wherein there is shown and described illustrative embodiments of the invention.

The invention and its objects and advantages will become more apparent in the detailed description of the preferred embodiment presented below.

BRIEF DESCRIPTION OF THE DRAWINGS

While the specification concludes with claims particularly pointing-out and distinctly claiming the subject matter of the present invention, it is believed the invention will be better understood from the following description when taken in conjunction with the accompanying drawings wherein:

DETAILED DESCRIPTION OF THE INVENTION

The present description will be directed in particular to elements forming part of, or cooperating more directly with, apparatus in accordance with the invention. It will be understood that elements not specifically shown or described may take various forms well known to those skilled in the art.

Figure 1:
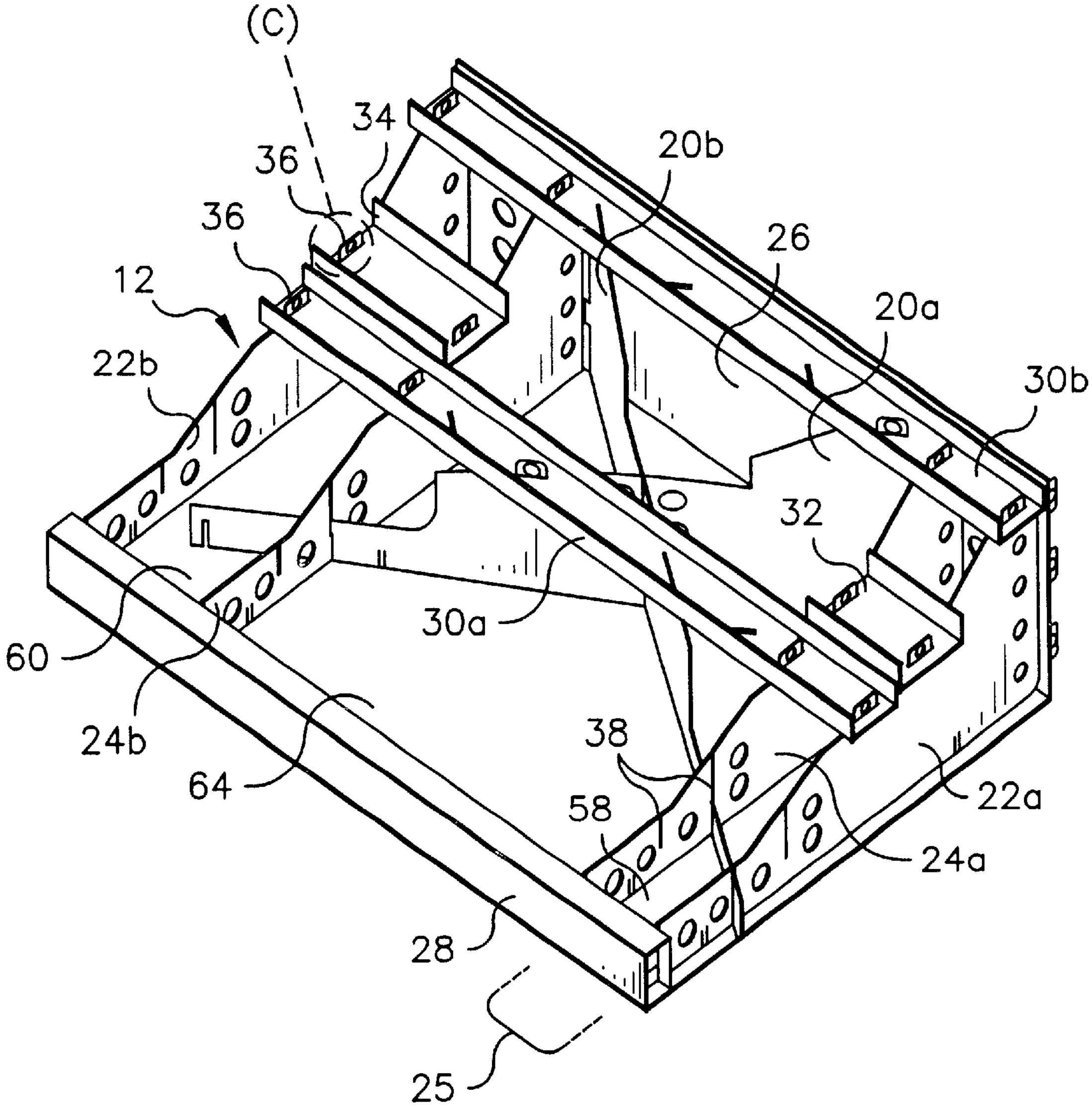
FIG. 1 is a perspective view of a sheet metal frame according to the preferred embodiment of this invention.

Referring to FIG. 1, there is shown a sheet metal frame 12 that forms a skeleton for the chassis of a print engine. In the preferred embodiment, sheet steel of 0.090 inch nominal thickness is used to provide strength. Sheet steel members are cut from stock using laser cutting techniques, well known in the sheet metal art.

Sheet metal frame 12 comprises outer walls 22*a* and 22*b*, inner walls 24*a* and 24*b*, a rear wall 26, and a front member 28, all mounted on a base 64. Sheet metal frame 12 further comprises supporting and bracing structures, including full-length cross-struts 30*a* and 30*b* and cross braces 20*a* and 20*b*. A left cross-strut 34 spans between outer wall 22*b* and inner wall 24*b*. A right cross-strut spans between outer wall 22*a* and inner wall 24*a*.

Referring again to FIGS. 1 and 2, rigid members that form sheet metal frame 12 are joined using slot-and-tab construction. At each junction of rigid members, a slot 38 is provided. In this arrangement, slot 38 mates with a corresponding slot 38 on a joining member or slot 38 is fitted to a tab 36. Rear wall slots 38*a* are widened to seat tabs 36 from cross braces 20*a* and 20*b*.

Figure 2:
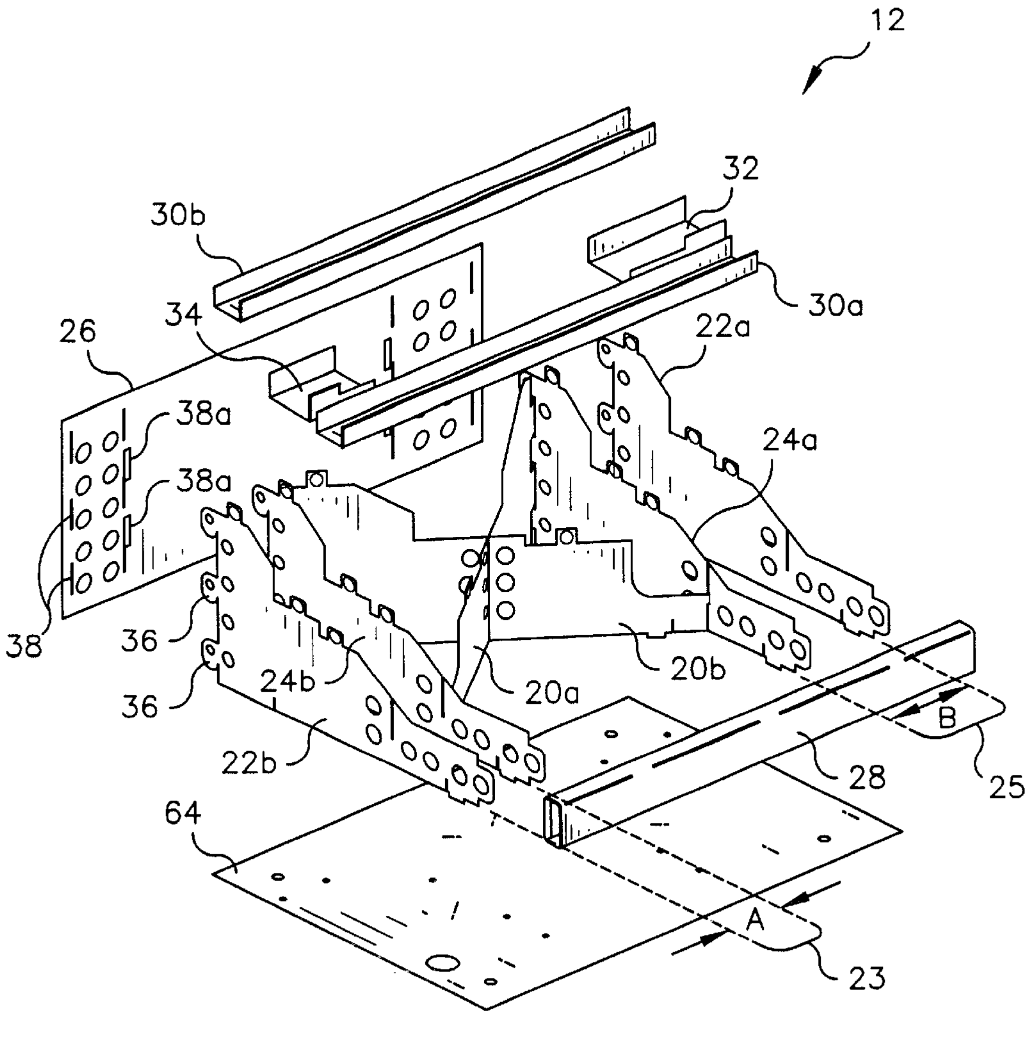
FIG. 2 is an exploded, perspective view of a sheet metal frame for a print engine chassis assembled without fasteners.

Using an arrangement of rigid members configured as is shown in FIGS. 1 and 2, it can be seen that a design can be implemented that allows use of the same rigid members for different print engine configurations. For example, inner wall 24*a* could be disposed further to the left within sheet metal frame 12 to provide a wider sidewall 25, in the embodiment shown in FIG. 2. This might be preferable, for example, where the weight of supported motor structures requires additional support. By cutting additional slots into front member 28, cross braces 20*a* and 20*b*, and rear wall 26, inner wall 24*b* could be suitably repositioned in a number of different locations, at different distances from outer wall 22*b*. Alternately, the overall dimensions of sheet metal frame 12 could be altered while using many of the same sheet metal members. For example, the length of a chassis frame could be changed simply by altering the lengths of full-length cross struts 30*a* and 30*b*, front member 28, base 64, and rear wall 26.

Figure 4:
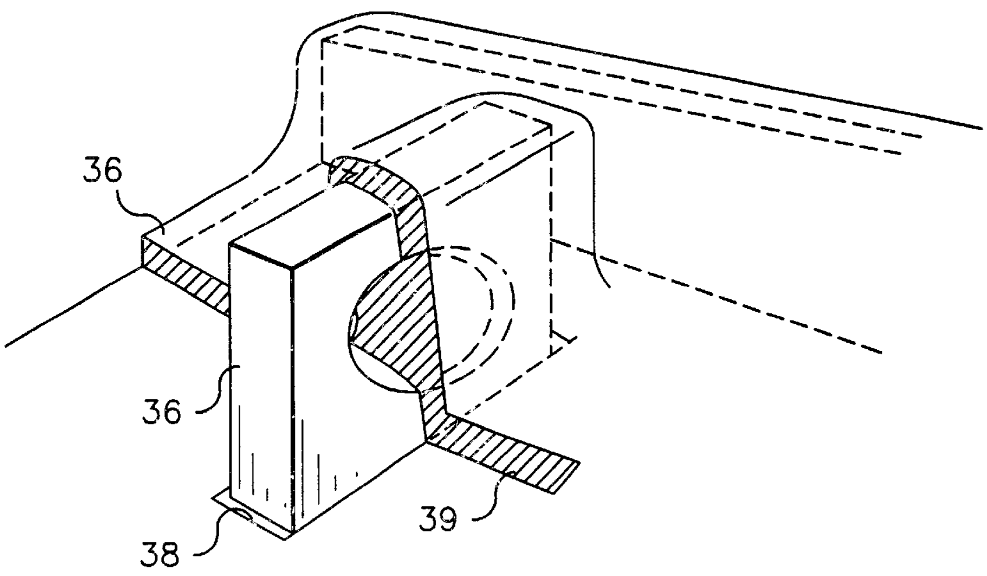
FIG. 4 is a perspective view, partly cut away of a portion of the sheet metal frame shown in FIG. 1 after coating with a plastic to lock the tabs into place.

After assembly, sheet metal frame 12 is coated with a plastic. FIG. 4 shows an enlarged view of section C of FIG. 1, partially cut away, after coating with plastic 39. Plastic 39 bonds to individual rigid interlocking members providing corrosion resistance and locking rigid members in place relative to each other, As shown in FIG. 4, tab 36, which has been fitted into slot 38 is held into place by plastic 39.

A number of types of plastic coating may be applied. In the preferred embodiment, "ND PLASTISOL," a PVC material provided by ND Industries, located in Troy, Mich. is used. This plastic compound is applied in successive layers, to build up a coating that is nominally 0.25 inches thick. The resulting sheet metal frame 12 forms a rigid structure, with sheet metal members securely held in place at slots 38 and tabs 36. The coated sheet metal frame 12 is inherently vibration-resistant, which helps to minimize the effects of vibration from motors, fans, vacuum equipment, and other devices supported by the print engine chassis.

Figure 3:
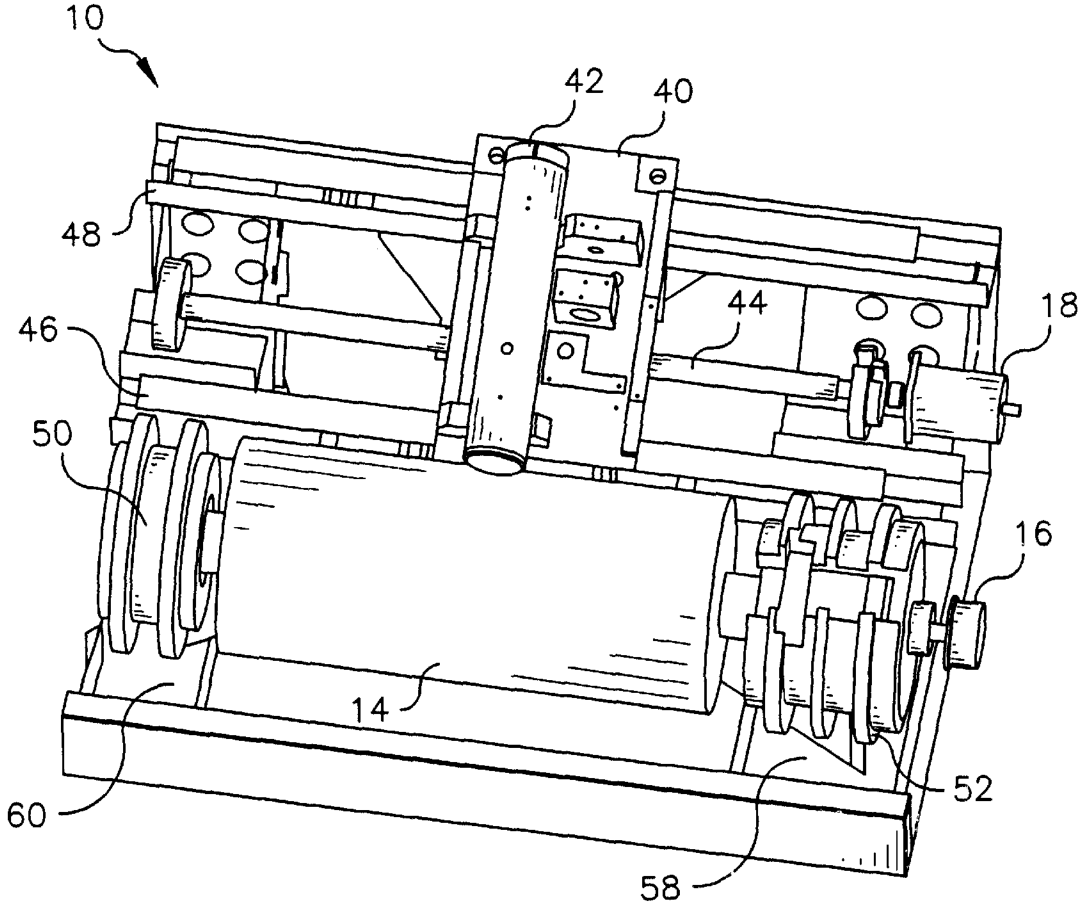
FIG. 3 is a perspective view of a print engine having an imaging drum, printhead translation assembly, and associated motors.

Referring to FIG. 3, a print engine 10 comprises an imaging drum 14, driven by a drum motor 16. Imaging drum 14 is mounted to rotate within a left hub end 50 and a right hub end 52 that support drum bearings (not shown). A translation motor 18 drives a printhead translation assembly 40 containing a printhead 42 by means of a lead screw 44. A front guide rail 46 and a rear guide rail 48 support printhead translation assembly 40 over its course of travel from right to left as viewed in FIG. 3.

Referring again to FIGS. 2 and 3, it can be seen that the design of sheet metal frame 12 allows a flexible arrangement of components for print engine 10. Sheet metal components can be configured to fit together at alternate slotted junctions, to suit the requirements of a specific design.

While the invention has been described with particular reference to its preferred embodiments, it will be understood by those skilled in the art that various changes may be made and equivalents may be substituted for elements of the preferred embodiments without departing from the invention. For example, sheet metal could be replaced at selective locations in the chassis by rigid plastic members.

Although the term plastic has been used throughout the description, a number of different coatings could be applied to the sheet metal frame, selected for characteristics such as ease of application, vibration damping performance, color, weight, and insulation value. The coating could be applied in a number of ways, for example by dipping, by spraying, or using a brush. Coating thickness could be varied based on the need for vibration damping, for example. Sheet metal members could be pre-coated prior to assembly, then coated again to provide a final surface coating after assembly.

PARTS LIST

10. Print engine
12. Sheet metal frame
14. Imaging drum
16. Drum motor
18. Translation motor
20*a*. Cross-brace
20*b*. Cross-brace
22*a*. Outer wall
22*b*. Outer wall
24*a*. Inner wall
24*b*. Inner wall
25. Sidewall
26. Rear wall
28. Front member
30*a*. Full-length cross-strut
30*b*. Full-length cross-strut
32. Right cross-strut
34. Left cross-strut
36. Tab
38. Slot
38*a*. Rear wall slots
39. Plastic
40. Printhead translation assembly
42. Printhead
44. Lead screw
46. Front guide rail
48. Rear guide rail
50. Left hub end
52. Right hub end
64. Base

What is claimed is:

1. A method for fabricating a print engine chassis for supporting an imaging drum and printhead translation assembly comprising the steps of:

coupling a plurality of rigid members at slotted junctions to form a sheet metal frame;

coating said sheet metal frame with a plastic to lock said rigid member in place; and wherein said rigid members are predipped in plastic prior to coupling.

2. The method of claim 1 wherein tabs fit into said slotted junctions.

* * * * *